Patented July 4, 1933

1,916,348

UNITED STATES PATENT OFFICE

JOSEPH VAN ACKEREN, OF PITTSBURGH, PENNSYLVANIA, ASSIGNOR TO THE KOPPERS COMPANY OF DELAWARE, A CORPORATION OF DELAWARE

COKING RETORT OVEN

Application filed August 10, 1928. Serial No. 298,864.

My invention relates to coking retort ovens and particularly to coking retort ovens of the horizontal combination type having crosswise regenerators.

An object of my invention is to provide a coke-oven battery in which substantially all counterflow between adjacent ducts and regenerators carrying fuel gas and air and waste gases is avoided.

A further object of my invention is to provide a battery of horizontal coke ovens of simplified construction in which crosswise regenerators and crossover flues may be employed.

A further object of my invention is to provide a simple and convenient arrangement of the regenerators and their connections to the heating walls of the coke-oven battery whereby the regenerators for carrying waste gas are always adjacent to each other and the regenerators for carrying fuel gas and air are always separate from the regenerators for carrying waste gases.

A still further object of my invention is to provide an arrangement of the regenerators whereby their number may be reduced to approximately half the usual requirement and the number of regenerator walls may be correspondingly reduced.

In accordance with my invention, I provide a coke-oven battery in which the horizontal coking chambers and heating walls alternate. The heating walls are each provided with a group of flame flues that are connected at their tops by a horizontal flue. The upper horizontal flues of adjacent heating walls are connected by crossover flues whereby the walls operate in pairs with their flame flues in series.

The lower ends of the groups of flame flues are each connected to two horizontal flues that respectively supply gas or air in one direction of the gases or transmit waste gases in the other direction of operation.

Beneath the structure of the heating walls and the coking chambers are two rows of regenerators, the rows extending lengthwise of the battery. The regenerators extend crosswise of the battery half the width of the latter. The rows of regenerators are not coextensive but are offset with respect to each other, all of the regenerators of each row, with the exception of an end regenerator being respectively in alinement with a regenerator in the other row. Two adjacent horizontal flues respectively connected to groups of flame flues in adjacent walls are each connected to one of two regenerators that are in alinement.

The arrangement of the regenerators in two rows, one of which always transmits air and gas, permits the number of regenerators to be reduced to approximately half that of the usual arrangement since it is unnecessary to provide walls between adjacent regenerators for carrying air or adjacent regenerators for carrying fuel gas. This arrangement materially simplifies the construction of the regenerators and their connections to the several horizontal flues.

The details of construction and operation of the coke-oven battery of my invention will now be described in connection with the accompanying drawings, in which Figure 1 is a view in longitudinal section of a portion of the battery taken on lines C—C and D—D of Fig. 3;

Figure 1:
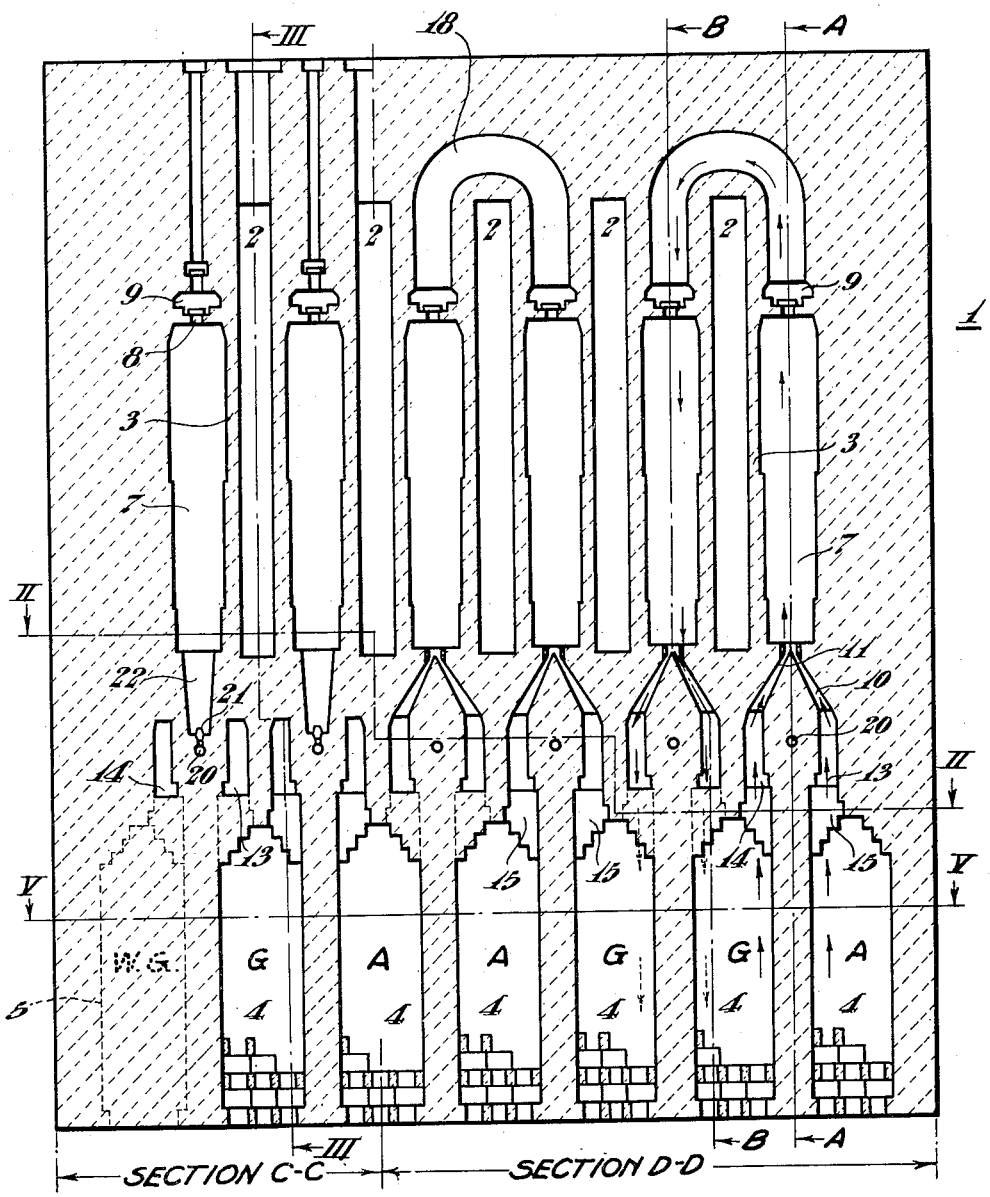
Figure 2:
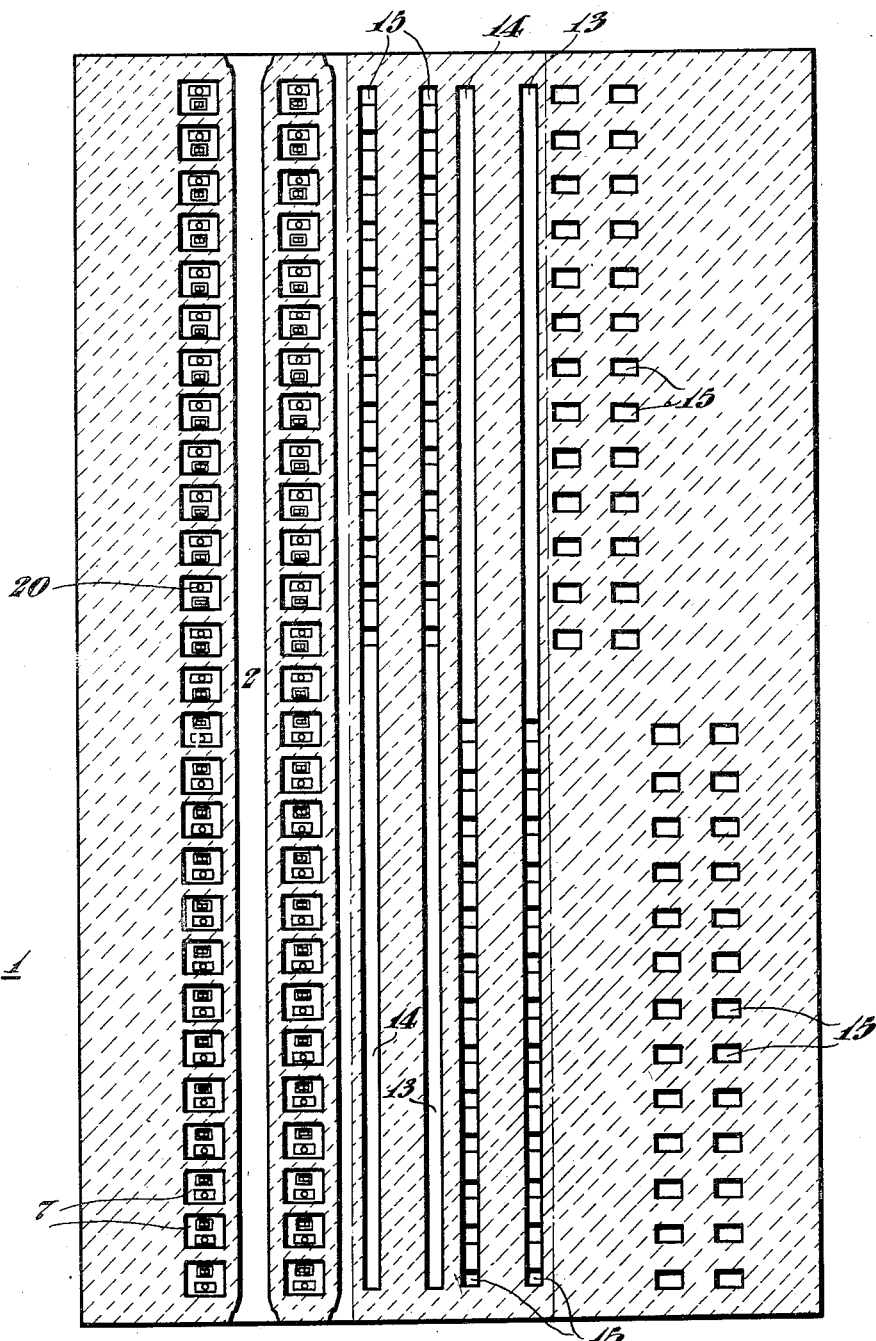
Fig. 2 is a view in horizontal section, taken on line II—II of Fig. 1.
Figure 3:
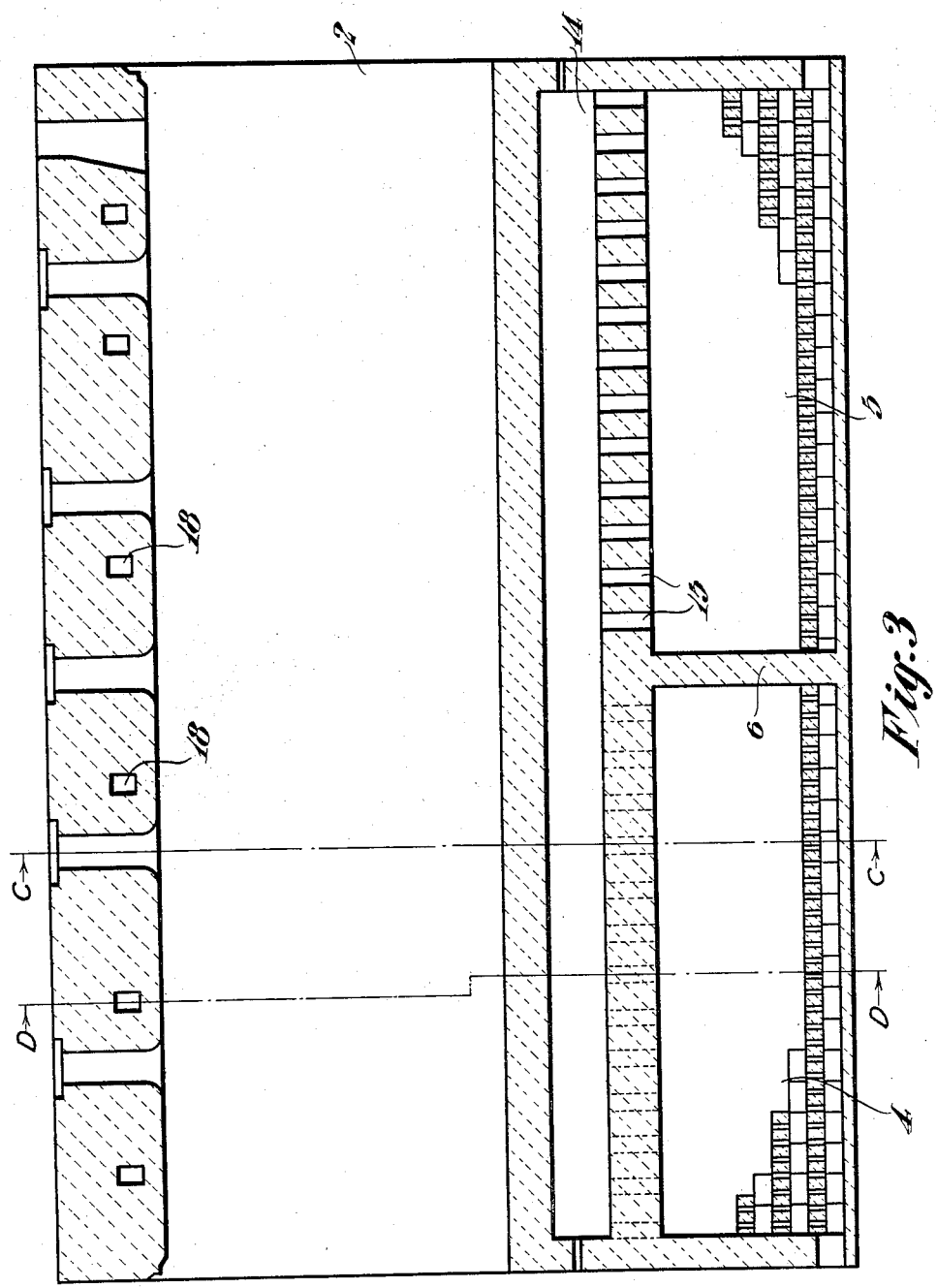
Fig. 3 is a view in transverse section, taken on line III—III of Fig. 1.
Figure 4:
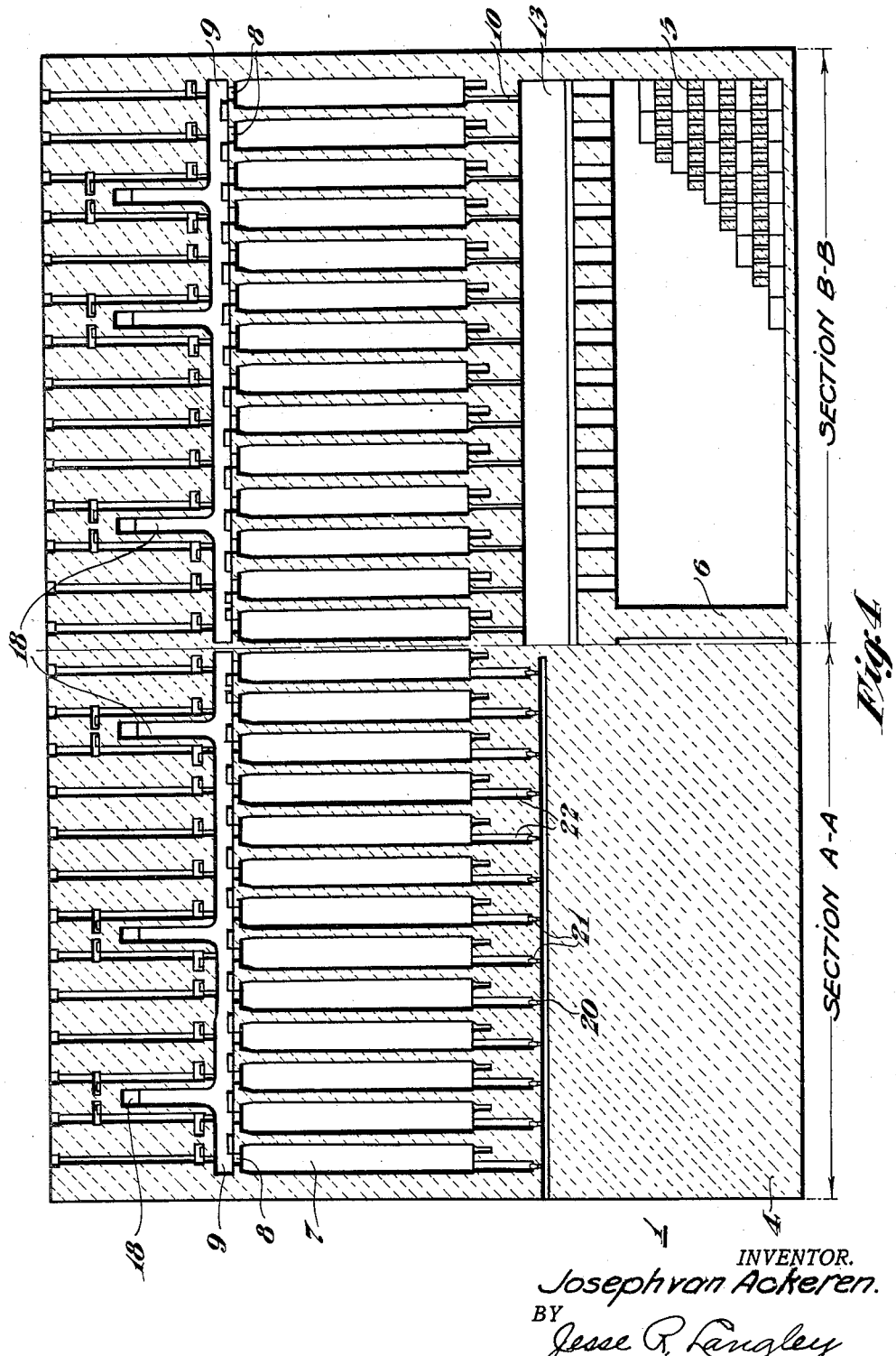
Fig. 4 is a view in transverse section, taken on lines A—A and B—B of Fig. 1.

Referring particularly to Figs. 1, 3 and 4, a horizontal coke-oven battery 1, constructed in accordance with my invention, comprises a series of alternately disposed coking chambers 2 and heating walls 3 that may be of any desired number. By way of example, the present battery is provided with five coking chambers or ovens with their associated six heating walls. It will be understood that the number of coking chambers and heating walls may be extended, as desired.

Figure 5:
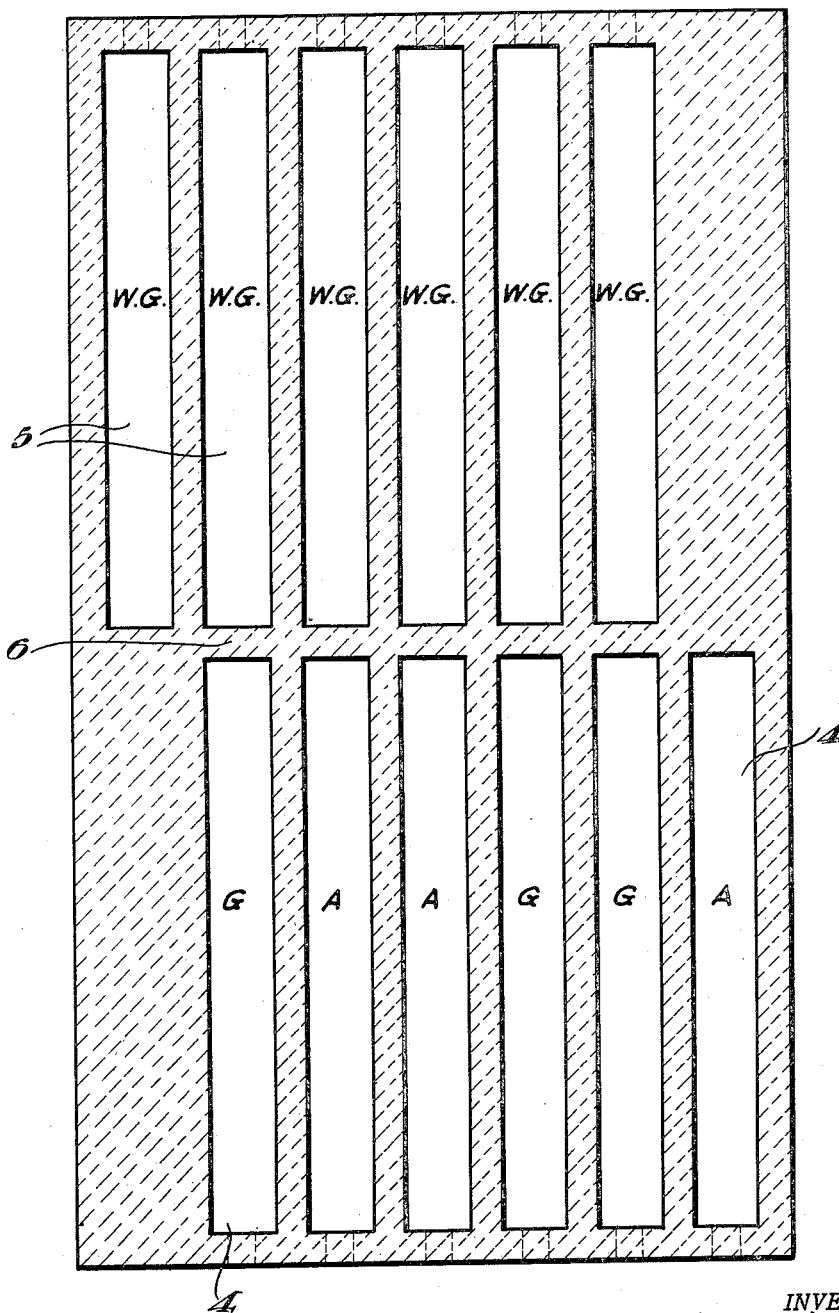
Fig. 5 is a horizontal sectional view of the regenerator arrangement taken on line V—V of Fig. 1.

Beneath the coking chambers and heating walls are a plurality of crosswise regenerators 4 and 5 that are respectively arranged in two rows, the rows extending lengthwise of the battery. Each regenerator extends substantially half the width of the battery and the rows of regenerators are separated by a partition wall 6. As best shown in Fig. 5, the rows of regenerators do not coincide but are offset in such manner that one regenerator of each row is located beyond the end regenerator of the other row. The purpose of this arrangement will be hereinafter apparent from a further description.

Each heating wall 3 is provided with a series of flame flues 7, twenty-seven being shown by way of example. Each flame flue is connected at the top through a port 8 to one of two upper horizontal flues 9, each of which extends approximately half the length of the wall. Each flame flue 7 is also connected at the bottom thereof through ducts 10 and 11, respectively, to two lower horizontal flues 13 and 14 that extend substantially the entire length of the heating wall.

Each of the lower horizontal flues 13 and 14 is connected to one of the regenerators 4 or 5, as the case may be, by ducts 15. It may be noted that the flame flues 7 of alternate walls are connected through the lower horizontal flues 13 and 14 to regenerators 4 while the flame flues of the other walls are connected to regenerators 5. As shown in Figs. 1, 3 and 4, the upper horizontal flues 9 of adjacent walls are connected by crossover flues 18 whereby the flame flues of adjacent walls are connected in series, the walls being thus arranged in pairs.

Figure 6:
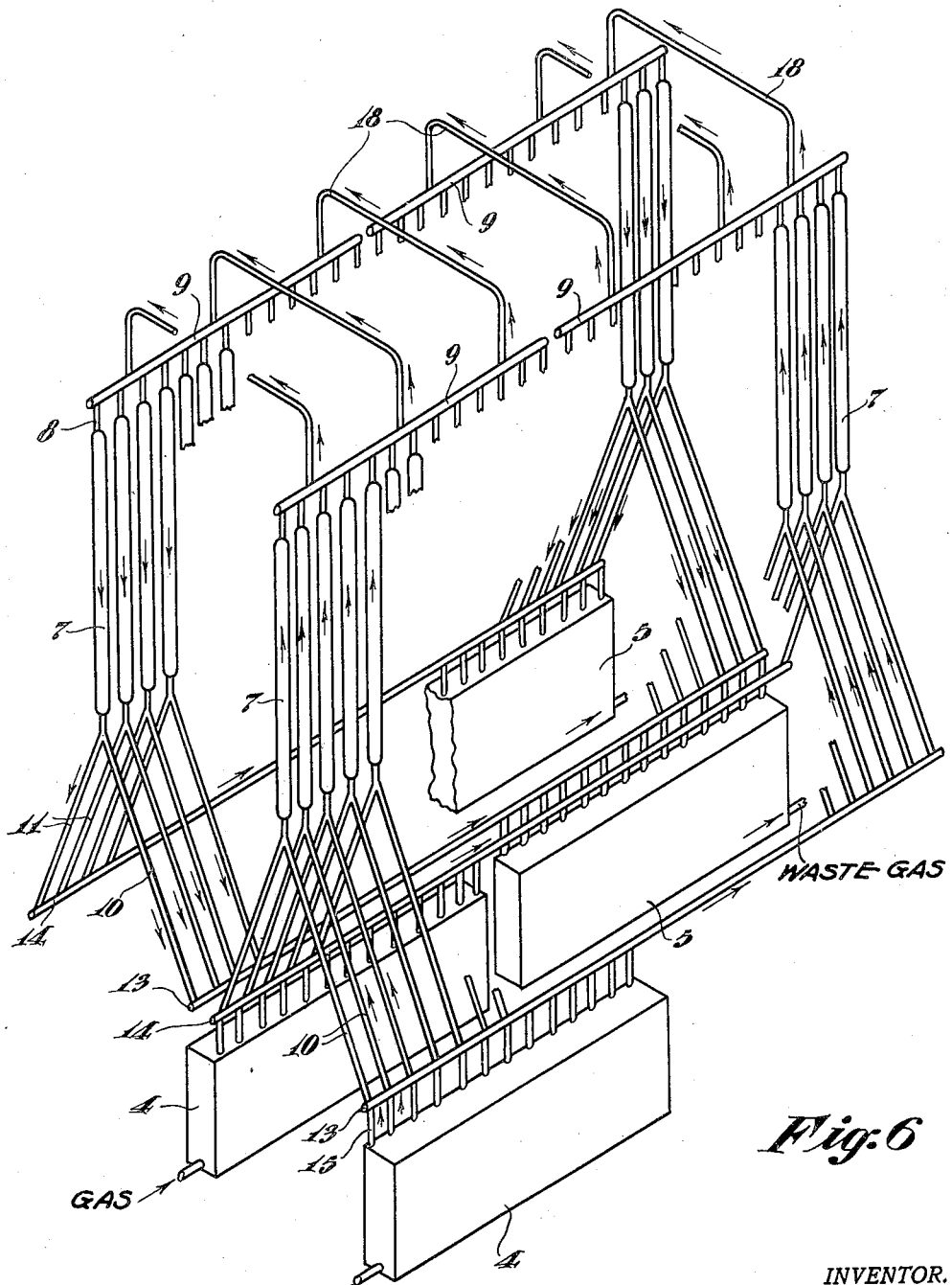
Fig. 6 is a flow diagram of the heating system of one pair of heating walls.

The connections between the several regenerators of the respective rows to the lower horizontal flues 13 and 14 and through the ducts 10 and 11 to the flame flues 7 and the connections whereby the walls are arranged in pairs is clearly shown in Fig. 6, portions of the several ducts and passageways being omitted for the sake of clearness.

The battery is also provided with gas guns 20 by means of which rich gas may be supplied to each of the flame flues 7 through a nozzle 21 located in a recess 22 in the bottom of the flue.

The operation of the battery will be described in connection with Fig. 6, the operation of one pair of heating walls being typical of the operation of the remainder of the battery. It may be assumed that fuel gas, such as producer gas or other lean gas, and air are being supplied through regenerators 4 to the lower horizontal flues 13 and 14 for distribution to the several flame flues 7 of one of the heating walls 3. The combustible materials ignite in the lower ends of the flame flues of the wall to which air and gas are supplied and burn upwardly therein.

The products of combustion pass upwardly through the ducts 8 into the upper horizontal flues 9 and through the cross-over flues 18 into the upper horizontal flues 9 of the adjacent wall. The hot gases of combustion pass downwardly through the flame flues 7 and ducts 10 and 11 of the second wall into the horizontal flues 13 and 14. They then pass through the ducts 15 into the regenerators 5 where they are discharged into the stack in the usual manner.

The direction of operation is periodically reversed in accordance with usual practice. Air and gas are then supplied through the regenerators 5 which have been previously heated by hot waste gases and the conditions are reversed in that combustible materials burn upwardly in the second wall and pass downwardly through the flame flues and connected passageways and out to the stack through the regenerators 4. The arrangement of the regenerators 5 for carrying gas and air is the same as that of the regenerators 4 under similar conditions described below.

As indicated by the respective legends A, G and WG, Figs. 4 and 5, referring to air, gas and waste gas, in the direction of operation in which air and gas are supplied to the generators 4, the air and gas regenerators are arranged in pairs whereby partition walls between the members of each pair may be substantially eliminated since it is not necessary that the regenerators be separate. Accordingly, while the regenerators have been indicated generally in Fig. 5, for example, as separate regenerators, the several pairs of regenerators may in practice be combined.

When coke oven gas or other rich gas is used as fuel, the operation is as above decribed except that the gas is supplied directly to the flame flues without being heated by the regenerators and that all of the regenerators in one row carry air while the other row carries waste gases.

The arrangement of the regenerators in offset rows enables two regenerators that are in alinement and one of which is transmitting air or gas, as the case may be, and the other of which is transmitting waste gas, to be connected to adjacent horizontal flues that are, however, connected to the flame flues of different walls. It will be noted, also, from an inspection of Fig. 6, the waste gases and fuel gas or air in adjacent flues are always passing in the same direction whereby there is no counterflow between them. This arrangement also insures that there is no counterflow between adjacent regenerators carrying fuel gas and waste gas, respectively, since in either direction of operation all of the regenerators in one row carry air or fuel gas while the regenerators in the other row carry waste gases.

It will be appreciated that the arrangement of the regenerators and the connected passageways permits the construction of a coke-oven battery of relatively simple brickwork and connections.

My improved coke-oven battery also includes crosswise regenerators and crossover flues for connecting the flame flues of adjacent walls which combination has heretofore been difficult to provide.

The foregoing and other advantages will be apparent to those skilled in the art relating to the construction and operation of coke ovens. My invention is not to be limited except as expressed in the appended claims.

I claim as my invention:

1. In a coking retort oven structure, two adjacent heating walls having flame flues therein, means for connecting the flame flues of one wall in series with those of the other wall, two parallel rows of regenerators beneath said walls, each regenerator extending about half the length of one of said heating walls, means for communicably connecting the flame flues of one of said walls to two adjacent regenerators in one of said rows and means for communicably connecting the flame flues of the other wall to two regenerators in the other row that are staggered with respect to the first-mentioned two regenerators.

2. In a coking retort oven structure, a plurality of heating walls with coking chambers alternating therebetween, said heating walls having flame flues therein, means for communicably connecting said flame flues to arrange the walls in pairs for gas flow in series from the flues of one wall of a pair to the flues of the other wall of the same pair, two parallel rows of regenerators beneath the heating walls and coking chambers, each regenerator extending about half the length of a coking chamber and the rows of regenerators being offset from each other, and means for communicably connecting the flame flues of each wall of a pair to two regenerators of a row that are offset from the regenerators of the other row that are communicably connected to the other wall of the pair.

3. In a coking retort oven structure, a plurality of heating walls with coking chambers alternating therebetween, said heating walls having flame flues therein, means for communicably connecting the flame flues to arrange the walls in pairs for gas flow in series from the flues of one wall of a pair to the flues of the other wall of the same pair, two parallel rows of regenerators beneath the heating walls and coking chambers, each regenerator extending about half the length of one of said heating walls and the rows of regenerators being offset from each other, and means for so communicably connecting the flame flues of each of said walls to two regenerators that the regenerators of one row may operate simultaneously as inflow regenerators while all the regenerators of the other row operate as outflow regenerators.

4. In a coking retort oven structure, a row of horizontal oven chambers and heating walls alternating therewith, each of said heating walls being provided with a plurality of flame flues, means for connecting the flame flues of adjacent walls in series, a plurality of regenerators beneath said oven chambers and said heating walls and communicably connected to said flame flues, said regenerators being arranged in two parallel rows each of which extends lengthwise of the row of oven chambers and about half the length of one of said oven chambers, and means for supplying gas and air to all regenerators in one row simultaneously and at the same time withdrawing waste gases from the regenerators of the other row.

5. In a coking retort oven structure, a row of oven chambers and heating walls alternating therewith, each of said heating walls being provided with a plurality of flame flues, a plurality of regenerators certain only of which are in alinement with other regenerators transversely of said row, said regenerators being in two parallel offset rows, and means for communicably connecting the flame flues of adjacent walls to regenerators that are in such alinement.

6. In a coking retort oven structure, a row of oven chambers and heating walls alternating therewith, each of said heating walls being provided with a plurality of flame flues, a plurality of regenerators certain only of which are in alinement transversely of said row, said regenerators being in two parallel offset rows and means for communicably connecting the flame flues of adjacent walls to regenerators that are in such alinement and to other regenerators that are out of alinement with each other and with the alined regenerators.

7. In a coking retort oven structure, a plurality of coking chambers and heating walls alternating therewith, each of said walls being provided with a group of flame flues, the flame flues of adjacent walls being connected in series to connect said walls in pairs, two horizontal flues communicably connected to one end of the flame flues of each group, two parallel offset rows of regenerators beneath said heating walls and said regenerators being parallel with the latter, certain only of the regenerators in the respective rows being in alinement and means for communicably connecting horizontal flues that are communicably connected to different groups to regenerators in alinement.

8. In a coking retort oven structure, a plurality of coking chambers and heating walls alternating therewith, each of said heating walls being provided with a group of vertical flame flues and the flame flues of each group being communicably connected at the respective upper and lower ends thereof by horizontal flues that extend substantially the length of the heating wall, a plurality of regenerators in two parallel longitudinally offset rows beneath said coking chambers and said heating walls, each regenerator extending substantially half the length of one of said heating walls, and means for communicably connecting adjacent horizontal flues that communicate with groups of flame flues in adjacent heating walls, respectively, to regenerators in the respective rows and in alinement with each other.

9. In a coking retort oven structure, a series of alternate coking chambers and heating walls therefor arranged side-by-side in a row, said heating walls having flame flues therein, means for connecting said flame flues to arrange the walls in pairs for gas flow in series from the flues of one wall of a pair to the flues of the other wall of the same pair, two parallel rows of regenerators beneath the heating walls and coking chambers, each regenerator extending about half the length of one of said heating walls and the rows of regenerators being offset from each other, means comprising horizontal flues for communicably connecting the flame flues of each wall of said pairs to two regenerators in one of the respective rows, and means for supplying gas and air to all regenerators in one row while withdrawing waste gas from all the regenerators in the other row, whereby there would be no simultaneous counterflow between waste gases and gas or air in the several horizontal flues.

10. In a horizontal coking retort oven structure, a plurality of coking chambers and heating walls alternating therewith, regenerators beneath said coking chambers and extending about half the length of a coking chamber and arranged in two parallel offset rows, each of said heating walls being provided with flame flues and two lower horizontal flues each of which communicates with said flame flues of one of said walls and means for communicably connecting each of said horizontal flues to one of said regenerators.

11. In a horizontal coking retort oven structure, a plurality of coking chambers and heating walls alternating therewith, regenerators beneath said coking chambers and extending about half the length of one of said coking chambers and arranged in two parallel offset rows, each of said heating walls being provided with flame flues, a single upper horizontal flue connected to the flame flues of each heating wall, crossover flues for connecting the upper horizontal flues of adjacent heating walls to connect the latter in pairs, two lower horizontal flues connected to the flame flues of each heating wall, and means for connecting each of said lower horizontal flues to one of said regenerators.

12. In a horizontal coking retort oven structure, a plurality of coking chambers and heating walls alternating therewith, crosswise regenerators extending about half the length of the coking chambers and arranged in two parallel offset rows, each of said heating walls being provided with flame flues and two lower horizontal flues communicating therewith and extending substantially the length of said heating walls, means for communicably connecting the flame flues of adjacent heating walls in series, and means for communicably connecting both of the lower horizontal flues communicating with the flame flues of a wall to regenerators in the same row.

13. In a horizontal coking retort oven structure, a series of alternate horizontal coking chambers and heating walls therefor arranged side-by-side in a row, regenerators below the coking chambers, each of the regenerators extending in a direction that is parallel to the heating walls about half the length of the heating walls and arranged in two parallel offset rows, each of said heating walls being provided with flame flues and two lower horizontal flues communicably connected thereto, means for connecting the flame flues of pairs of adjacent heating walls in series, and means for communicably connecting the lower horizontal flues communicating with the flame flues of adjacent walls to regenerators in the respective rows.

14. In a horizontal coking retort oven structure, a plurality of coking chambers and heating walls alternating therewith, regenerators beneath said coking chambers and extending about half the length of the coking chambers and arranged in two parallel offset rows, each of said heating walls being provided with flame flues, a single upper horizontal flue in each of said heating walls and communicably connected to the flame flues therein, crossover flues for communicably connecting the upper horizontal flues of adjacent heating walls to connect the latter in pairs for gas flow in series from the flues of one wall of a pair to the flues of the other wall of the same pair, two lower horizontal flues communicating with the flame flues of each heating walls, and means for communicably connecting each of the lower horizontal flues communicating with the flame flues of one wall of each pair to a regenerator in one of said rows and each of the lower horizontal flues communicating with the other wall of each pair to a regenerator in the other row.

In testimony whereof, I have hereunto subscribed my name this 8th day of August 1928.

JOSEPH VAN ACKEREN.